United States Patent

Jansen et al.

[11] Patent Number: 5,729,113
[45] Date of Patent: Mar. 17, 1998

[54] SENSORLESS ROTOR VELOCITY ESTIMATION FOR INDUCTION MOTORS

[75] Inventors: Patrick Lee Jansen, Alplaus; William James Premerlani, Scotia, both of N.Y.; Neil Richard Garrigan, Madison, Wis.

[73] Assignee: General Electric Company, Schenectady, N.Y.

[21] Appl. No.: 786,583

[22] Filed: Jan. 21, 1997

[51] Int. Cl.$^6$ ............................................ H02P 5/40
[52] U.S. Cl. ........................ 318/799; 318/616; 318/798
[58] Field of Search ................................. 318/565, 615, 318/616, 798–804

[56] References Cited

U.S. PATENT DOCUMENTS

| | | | |
|---|---|---|---|
| 4,691,152 | 9/1987 | Ell et al. | 318/616 |
| 4,862,054 | 8/1989 | Schauder | 318/800 |
| 4,968,925 | 11/1990 | De Doncker . | |
| 5,057,759 | 10/1991 | Ueda et al. | 318/616 |
| 5,144,216 | 9/1992 | De Doncker . | |
| 5,166,593 | 11/1992 | De Doncker et al. . | |
| 5,559,419 | 9/1996 | Jansen, et al. . | |
| 5,565,752 | 10/1996 | Jansen et al. . | |
| 5,585,709 | 12/1996 | Jansen et al. . | |

OTHER PUBLICATIONS

"Transducerless Position and Velocity Estimation in Induction and Salient AC Machines" By PL Jansen, et al, IEEE–IAS Annual Meetting, Oct. 1994, PG. 488–495 Denver.
"Sensorless Direct Field Orientation at Zero Flux Frequency" By F. Baschke, et al, IEEE–IAS Annual Meeting Oct. 1996. pp. 189–196.

*Primary Examiner*—Bentsu Ro
*Attorney, Agent, or Firm*—Ann M. Agosit; Marvin Snyder

[57] ABSTRACT

A method for estimating rotor shaft velocity includes adding two counter rotating signal components to a fundamental motor control signal to provide a combined control signal; sensing at least one motor phase signal; determining an extracted portion of the motor phase signal representative of the two counter rotating signal components; and using the extracted portion to estimate rotor shaft velocity. The step of adding two counter rotating signal components may include either adding a single phase signal in a reference frame synchronous to the fundamental motor control signal or adding two separate signals.

26 Claims, 6 Drawing Sheets

SENSORLESS ROTOR VELOCITY ESTIMATION FOR INDUCTION MOTORS

BACKGROUND OF THE INVENTION

Eliminating rotor shaft velocity sensors such as encoders, resolvers, or tachometers is desirable for improving motor reliability, reducing costs, and reducing motor package size in adjustable speed drives. An obstacle to control embodiments for induction motors without velocity sensors is the inability of determining velocity at or near zero excitation frequency for sustained periods of time.

SUMMARY OF THE INVENTION

It would be desirable to have a method of obtaining control of induction motors in high performance drives that is robust at all operating frequencies and speeds, particularly low frequency and zero frequency conditions, without the need for rotor position or velocity shaft transducers.

In the present invention, measured motor terminal voltages and currents are used to estimate rotor velocity which can then be used for controlling the induction motor.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
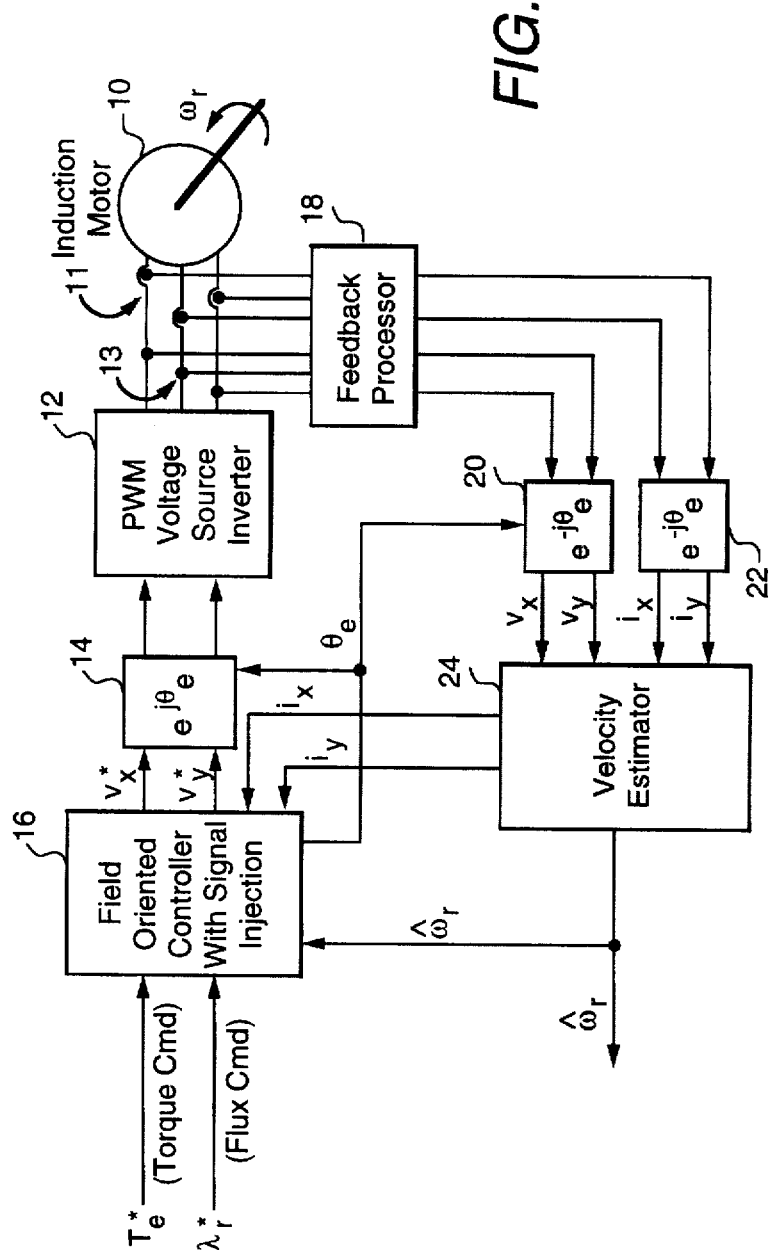
FIG. 1 is a block diagram of a motor drive system of the present invention.

FIG. 1 is a block diagram of a motor drive system including an induction motor 10 driven by a pulse width modulating (PWM) voltage source inverter 12, a field oriented controller 16, a synchronous-to-stationary frame transformation block 14, current sensors 11, voltage sensors 13, a feedback processor 18, stationary-to-synchronous frame transformation blocks 20 and 22, and a velocity estimator 24.

Polyphase current rotating in the same direction as, but faster than, the rotor of an induction motor will create a torque in a direction so as to aid rotor rotation. In this situation, net electrical power flow is into the motor electrical terminals, and the motor is in a "motoring" state. Conversely, polyphase currents rotating slower than the motor create a torque in a direction opposing the rotor rotation. Net electrical power flow is thus out of the motor electrical terminals, and the motor is in a "generating" state.

In the present invention, two polyphase AC (alternating current) signals are injected into field oriented controller 16. The signals are counter rotating relative to the rotor and superimposed upon the fundamental excitation current or voltage of the rotor. The preferred frequencies of the signals range from about 5 to about 30 hertz and need not be of equal amplitude or frequency magnitude.

Whereas the fundamental excitation current or voltage is responsible for production of motor torque and power, the superimposed AC signals are of low power and are used for detection purposes only. The instantaneous real power produced by each of the two signals will differ as a function of rotor speed and direction. The two signals can be injected as current or voltage commands superimposed upon the fundamental excitation commands sent to the inverter by controller 16.

Controller 16 sends voltage commands $v^*_x$ and $v^*_y$ to transform block 14 which rotates the voltage commands from the synchronous to the stationary frame and in turn sends the transformed commands to inverter 12 for control of motor 10. Current and voltage sensors 11 and 13, respectively, sense current and voltage signals which are sent to feedback processor 18. Although three phase current sensors and three phase voltage sensors are preferred as shown, only two current sensors and voltage sensors are actually required because the third phase current and phase voltage can then each be calculated using Kirchoff's laws. Furthermore, although a three-phase motor is shown, the invention is also applicable to two-phase motors and to motors having more than three phases.

Feedback processor 18 includes signal conditioning elements such as anti-aliasing filters and a three phase to two phase transformation element. The two phase stationary frame voltage and current signals are then transmitted through stationary-to-synchronous frame transformation blocks 20 and 22, respectively, which send measured voltage signals, $v_x$ and $v_y$, and measured current signals, $i_x$ and $i_y$, to velocity estimator 24.

The velocity estimator separates the components of the measured signals which are due to the injected signals from the components due to the fundamental power and torque producing command signals and uses the injected signal components to estimate rotor velocity. Velocity estimator 24 sends the estimated rotor velocity $\hat{\omega}_r$ to controller 16 for use with the torque command $T^*_e$ and the rotor flux command $\lambda^*_r$ to determine the voltage commands via conventional techniques such as indirect field orientation methods incorporating a slip frequency calculator and current regulator. The current regulator is unique in the present invention because it incorporates AC signal injection. In the present invention, the ^ symbol is generally used to denote that the parameter below it is an estimated parameter, and the * symbol is generally used to denote that the parameter it follows is a commanded parameter.

Figure 2:
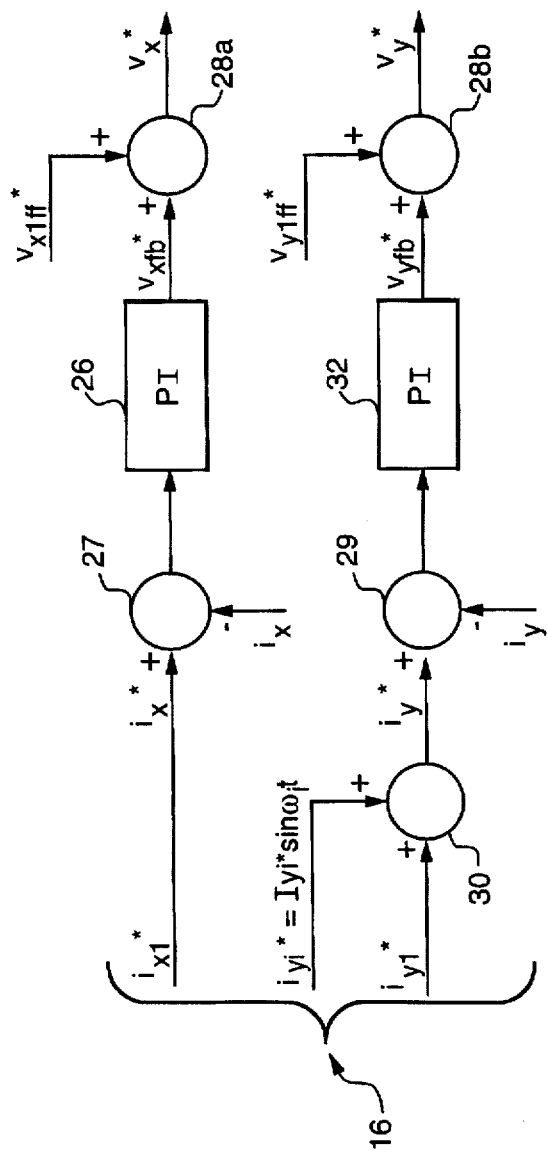
FIG. 2 is a block diagram of a synchronous frame (XY) PI current regulator with Y-axis AC (alternating current) signal current injection.

For purposes of example, FIG. 2 illustrates an injected current signal embodiment. With the alternative injected voltage signal embodiment, the injected voltage components would be added directly to create the commanded voltages $v^*_x$ and $v^*_y$.

When two counter rotating signal commands are of the same amplitude and the same frequency, though oppositely rotating relative to the fundamental excitation, a net signal command results that is single phase in the fundamental excitation (i.e. synchronous) reference frame, which can be aligned with the rotor flux vector, for example. The net signal command can then be injected solely into the flux-axis in the field oriented (i.e. vector or torque controlled) drives, as shown in the embodiment of FIG. 2. The primary advantage is that undesirable torque ripple caused by interactions of the injected signals with the fundamental excitation is then greatly reduced.

FIG. 2 is a block diagram of synchronous frame (XY) PI (proportional and integral) current regulators 26 and 32 with Y-axis AC signal current injection. The fundamental torque and flux producing command current signals are represented by $i^*_{x1}$ and $i^*_{y1}$. The injected current signal is represented by $i^*_{yi}$ and is obtained by multiplying the maximum amplitude of the injected signal ($I^*_{yi}$) by $\sin(\omega_i t)$, wherein $\omega_i$ is the injected signal frequency, which can be fixed or variable. The angle $\theta_i$ is the integral of $\omega_i$ over time t. If a variable frequency of $\omega_i$ is used, then each location of $\omega_i t$ within an operation should be replaced by $\theta_i$.

In the embodiment of FIG. 2, adder 30 calculates the sum of the fundamental signal on the Y-axis with the injected signal components to obtain a total signal $i^*_y$, and $i^*_x$ is the same as $i^*_{x1}$ (has no signal injected therein). Subtractors 27 and 29 can be used to subtract respective measured X-axis and Y-axis current signals from the total signals, and voltage signals from the PI regulators $v^*_{xft}$ and $v^*_{yft}$ can be added to respective fundamental feed forward voltages $v^*_{x1f}$ and $v^*_{y1f}$ by respective adders 28a and 28b to determine the net x-axis and y-axis voltage commands $v^*_x$ and $v^*_y$. The feed forward voltages can be calculated by the field oriented controller as follows:

$$v^*_{x1f} = \hat{R}_1 i^*_{x1} + \hat{L}_\sigma \frac{di^*_{x1}}{dt} - \hat{\omega}_e \frac{\hat{L}_m}{\hat{L}_r} \lambda^*_r, \text{ and}$$

$$v^*_{y1f} = \hat{R}_1 i^*_{y1} + \hat{\omega}_e \hat{L}_\sigma i^*_{x1},$$

wherein $\hat{R}_1$ represents stator resistance, $\hat{L}_\sigma$ represents stator transient inductance, $\hat{L}_m$ represents magnetizing inductance, $\hat{L}_r$ represents rotor inductance, $\lambda^*_r$ represents commanded rotor flux, and $\hat{\omega}_s$ is an estimated (or commanded) slip frequency which can be determined as follows, for example:

$$\hat{\omega}_s = \hat{R}_2 \frac{\hat{L}_m}{\hat{L}_r} \frac{i^*_{x1}}{\lambda^*_r},$$

wherein $\hat{R}_2$ represents rotor resistance.

Figure 3:
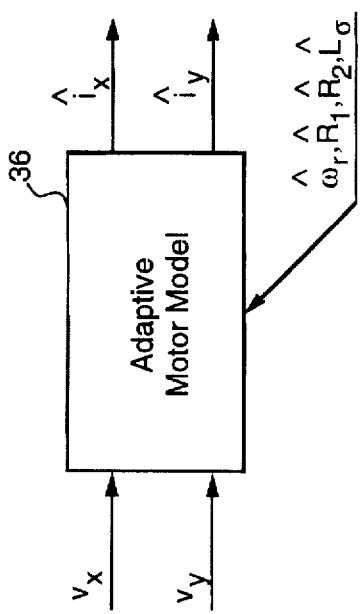
FIG. 3 is a block diagram of an adaptive motor model providing estimated current with adaptation of rotor velocity, resistance, and inductance.

FIG. 3 is a block diagram of an adaptive motor model 36 for use in the velocity estimator by providing estimated stator current signals $\hat{i}_x$ and $\hat{i}_y$ with adaptation of rotor velocity $\hat{\omega}_r$, stator resistance $\hat{R}_1$, rotor resistance $\hat{R}_2$, and stator transient inductance $\hat{L}_\sigma$.

The adaptive motor model is simulated in real-time using estimated motor parameters and estimations of rotor velocity. The model can be excited (i.e. supplied) by either the measured or commanded voltages or currents. In one embodiment, measured voltage prior to signal extraction (thus including the fundamental and the injected signal components) is used to excite the model. The resulting estimated signal currents from the motor model are then separated from the fundamental.

The dynamic equations characterizing the induction motor model can be formulated in any of a number of methods. For example, one conventional formulation with stator and rotor flux as state variables in the synchronous reference frame is as follows:

stator flux:
$$p\hat{\lambda}_{xs} = -\frac{\hat{R}_1}{\hat{L}_\sigma} \hat{\lambda}_{xs} + \omega_e \hat{\lambda}_{ys} + \frac{\hat{R}_1}{\hat{L}_\sigma} \frac{\hat{L}_m}{\hat{L}_r} \hat{\lambda}_{xr} + v_x$$

$$p\hat{\lambda}_{ys} = -\omega_e \hat{\lambda}_{xs} - \frac{\hat{R}_1}{\hat{L}_\sigma} \hat{\lambda}_{ys} + \frac{\hat{R}_1}{\hat{L}_\sigma} \frac{\hat{L}_m}{\hat{L}_r} \hat{\lambda}_{yr} + v_y$$

rotor flux:
$$p\hat{\lambda}_{xr} = \frac{\hat{R}_2}{\hat{L}_\sigma} \frac{\hat{L}_m}{\hat{L}_r} \hat{\lambda}_{xs} - \frac{\hat{R}_2}{\hat{L}_\sigma} \frac{\hat{L}_s}{\hat{L}_r} \hat{\lambda}_{xr} + (\omega_e - \hat{\omega}_r) \hat{\lambda}_{yr}$$

$$p\hat{\lambda}_{yr} = \frac{\hat{R}_2}{\hat{L}_\sigma} \frac{\hat{L}_m}{\hat{L}_r} \hat{\lambda}_{ys} - (\omega_e - \hat{\omega}_r) \hat{\lambda}_{xr} - \frac{\hat{R}_2}{\hat{L}_\sigma} \frac{\hat{L}_s}{\hat{L}_r} \hat{\lambda}_{yr}$$

stator currents:
$$\hat{i}_x = \frac{1}{\hat{L}_\sigma} \left[ \hat{\lambda}_{xs} - \frac{\hat{L}_m}{\hat{L}_r} \hat{\lambda}_{xr} \right]$$

$$\hat{i}_y = \frac{1}{\hat{L}_\sigma} \left[ \hat{\lambda}_{ys} - \frac{\hat{L}_m}{\hat{L}_r} \hat{\lambda}_{yr} \right]$$

wherein p represents the derivative operator with respect to time, $\omega_e$ is the synchronous reference frame velocity, and $\hat{L}_s$ is the stator inductance.

Figure 4:
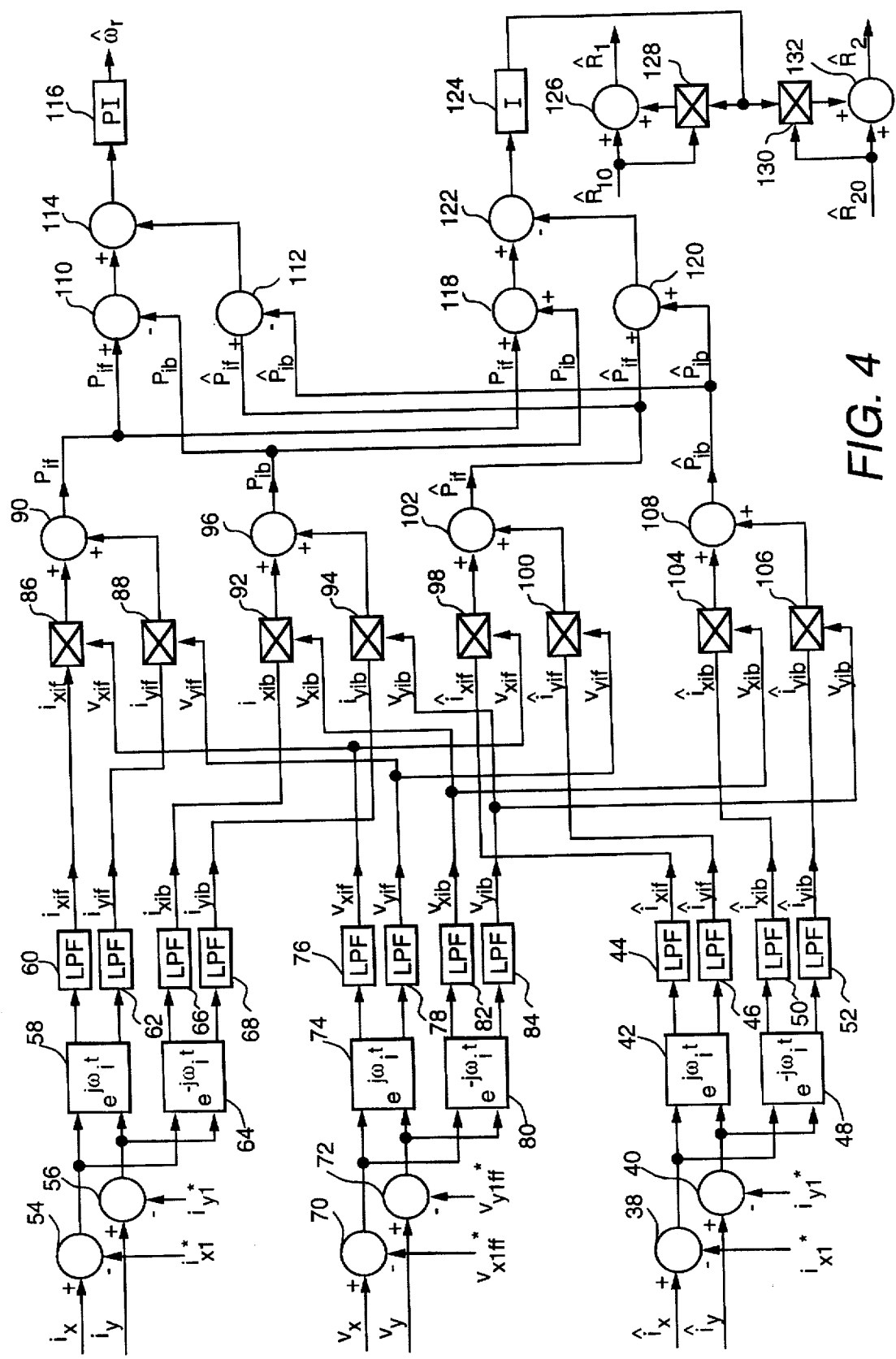
FIG. 4 is a block diagram of a processing system for estimating rotor velocity, stator resistance, and rotor resistance.

FIG. 4 is a block diagram of a processing system for estimating rotor velocity, stator resistance, and rotor resistance.

Subtractors 54 and 56 subtract the commanded fundamental current signals $i^*_{x1}$ and $i^*_{y1}$ from the measured current signals, respectively. Likewise Subtractors 70 and 72 subtract the commanded fundamental feed forward voltage signals $v^*_{x1\_f}$ and $v^*_{y1\_f}$ from the measured voltage signals, respectively, and subtractors 38 and 40 subtract the commanded fundamental current signals from the estimated current signals, respectively.

Forward transform blocks 58, 74, and 42 transform signals from respective subtractors 54, 70, and 38 which are then filtered by respective low pass filter pairs 60 and 62, 76 and 78, and 44 and 46 to provide measured forward-rotating signal currents $i_{xif}$ and $i_{yif}$ measured forward-rotating voltages $v_{xif}$ and $v_{yif}$, and estimated forward-rotating signal currents $\hat{i}_{xif}$ and $\hat{i}_{yif}$.

Backward transform blocks 64, 80, and 48 transform signals from respective subtractors 56, 72, and 40 which are then filtered by respective low pass filter pairs 66 and 68, 82 and 84, and 50 and 52 to provide measured backward-rotating signal currents $i_{xib}$ and $i_{yib}$, measured backward-rotating signal voltages $v_{xib}$ and $v_{yib}$, and estimated backward-rotating signal currents $\hat{i}_{xib}$ and $\hat{i}_{yib}$.

The counter rotating signal currents and voltages are used to calculate instantaneous real power of respective signals $p_{if}$ (forward-rotating feedback signal), $p_{ib}$ (backward-rotating feedback signal), $\hat{p}_{if}$ (forward-rotating estimated signal), and $\hat{p}_{ib}$ (backward-rotating estimated signal) by multiplying the measured signal voltages with corresponding ones of the estimated and measured signal currents using multipliers 86, 88, 92, 94, 98, 100, 104, and 106 and using adders 90, 96, 102, and 108 to add corresponding multiplications of the X and Y axes.

The instantaneous real power signals are, in turn, used to calculate the error signals for rotor velocity adaptation, stator resistance adaptation, and rotor resistance adaptation.

For estimating rotor velocity $\hat{\omega}_r$, the error signal is calculated by subtracting with subtractor 114 the difference in the forward-rotating and backward-rotating estimated power signals (obtained by subtractor 112) from the difference in the forward-rotating and backward-rotating feedback power signals (obtained by subtractor 110). The error signal is passed through a proportional and integral regulator 116 to dynamically adapt the estimated rotor velocity in the motor model, thereby driving the error to zero when the estimated rotor velocity matches the actual rotor velocity as determined in adaptive motor model 36 of FIG. 3.

For estimating stator and rotor resistances $\hat{R}_1$ and $\hat{R}_2$, respectively, the error signal is calculated by subtracting with subtractor 122 the combination of the forward-rotating and backward-rotating estimated power signals (obtained by adder 120) from the combination of the forward-rotating and backward-rotating feedback power signals (obtained by adder 118) and is passed through an integral regulator 124. The error signal is used to adapt the estimated stator and rotor resistances to minimize the sensitivity to variations and uncertainties in motor parameters in the adaptive motor model. The estimated stator resistance is obtained by multiplying the integral signal by an initial estimated stator resistance $\hat{R}_{10}$ with multiplier 128 and adding the result to $\hat{R}_{10}$ with adder 126. The estimated rotor resistance is obtained by multiplying the integral signal by an initial estimated rotor resistance $\hat{R}_{20}$ with multiplier 130 and adding the result to $\hat{R}_{20}$ with adder 132.

Figure 5:
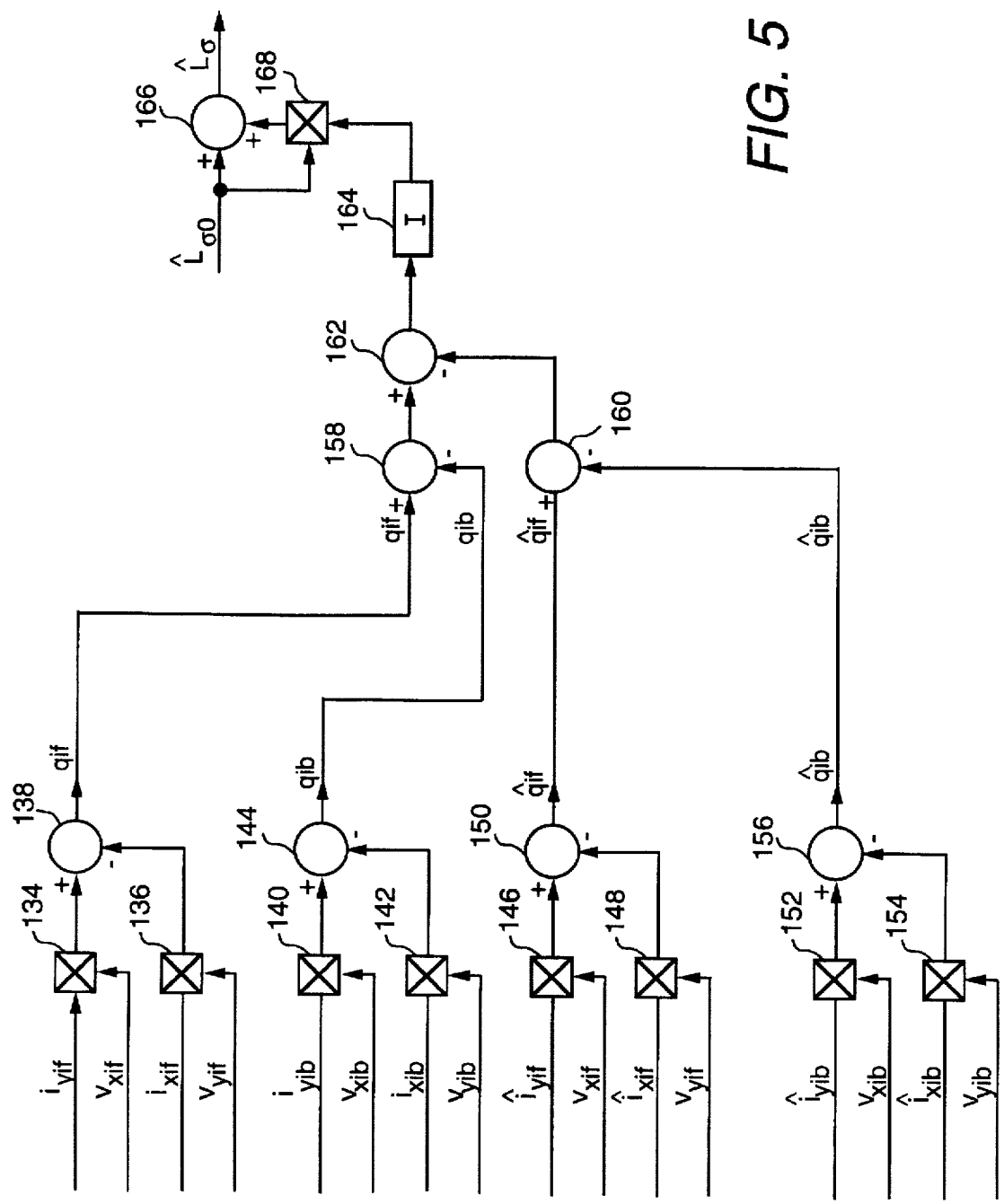
FIG. 5 is a block diagram of a processing system for estimating stator transient inductance.

FIG. 5 is a block diagram of a processing system for estimating stator transient inductance. The counter rotating signal currents and voltages are used to calculate the instantaneous reactive powers $q_{if}$ (forward-rotating feedback signal), $q_{ib}$ (backward-rotating feedback signal), $\hat{q}_{if}$ (forward-rotating estimated signal), and $\hat{q}_{ib}$ (backward-rotating estimated signal) by cross multiplying the measured signal voltages with the estimated and measured signal currents using multipliers 134, 136, 140, 142, 146, 148, 152, and 154 and using subtractors 138, 144, 150, and 156.

The instantaneous reactive power signals are used to calculate the error signal for stator transient inductance $\hat{L}_\sigma$. The error signal is calculated by subtracting with subtractor 162 the difference of the forward-rotating and backward-rotating estimated signals (obtained by subtractor 160) from the difference of the forward-rotating and backward-rotating feedback signals (obtained by subtractor 158) and is passed through an integral regulator 164. The estimated stator transient inductance is obtained by multiplying the integral signal by an initial estimated stator transient inductance $\hat{L}_{\sigma 0}$ with multiplier 168 and adding the result to $\hat{L}_{\sigma 0}$ with adder 166.

Although the figures comprise block diagrams for purposes of illustration, the velocity sensing embodiment can be either in analog form with discrete operating components or in digital form with the operations illustrated by the block diagrams being performed by a computer.

Figure 6:
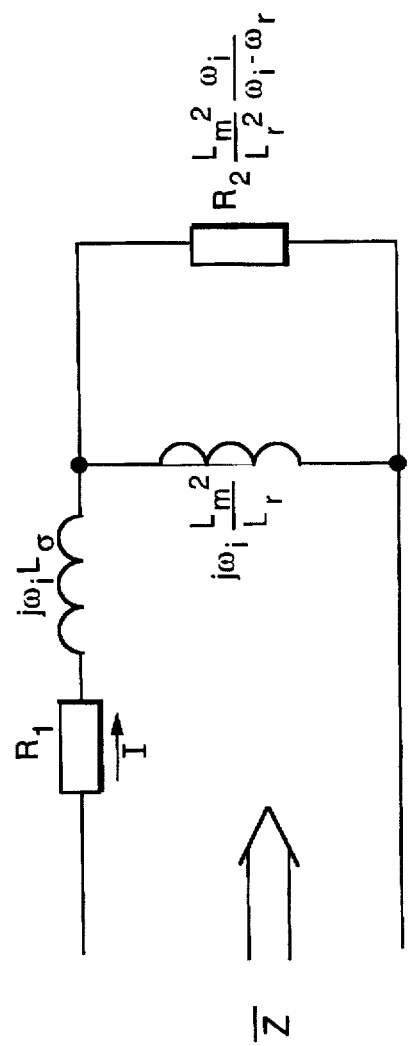
FIG. 6 is a circuit diagram of a steady-state per-phase equivalent circuit of an induction motor.

FIG. 6 is a circuit diagram of a steady-state per-phase equivalent circuit of an induction motor. The effective impedance of a polyphase induction motor as seen from the stator terminals for a balanced polyphase AC signal depends on the rotor velocity and the frequency and direction of rotation of the AC signal and can be calculated as follows:

$$\bar{Z} = R_1 + j\omega_i L_\sigma + j\frac{L_m^2}{L_r}\frac{\omega_i}{[1+j\tau_r(\omega_i-\omega_r)]}$$

wherein $L_m$ represents magnetizing inductance, $L_r$ represents rotor inductance (sum of the magnetizing and rotor leakage inductances), $L_\sigma$ represents stator transient inductance, $\omega_i$ represents the AC injected signal frequency, $\omega_r$ represents rotor velocity, and $\tau_r$ represents a rotor electrical time constant defined by $L_r/R_2$.

The real and imaginary components of the effective impedance can be calculated as follows:

$$\text{real}(\bar{Z}) = R_1 + \frac{L_m^2}{L_r}\frac{\tau_r\omega_i(\omega_i-\omega_r)}{[1+\tau_r^2(\omega_i-\omega_r)^2]} \text{ and}$$

$$\text{imag}(\bar{Z}) = \omega_i L_\sigma + \frac{L_m^2}{L_r}\frac{\omega_i}{[1+\tau_r^2(\omega_i-\omega_r)^2]}.$$

The rotor velocity $\omega_r$ influences the real component more strongly than the imaginary component.

Figure 7:
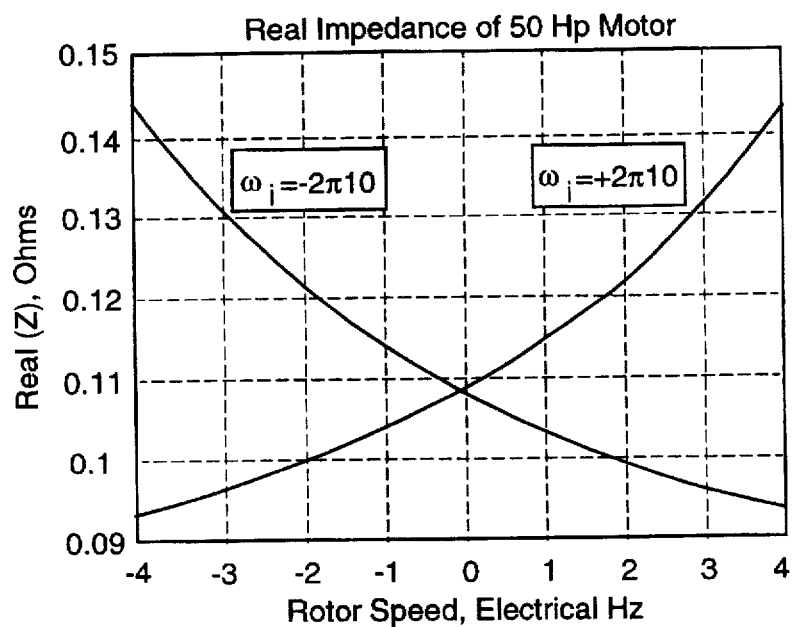
FIG. 7 is a graph showing a simulation of a real component of the impedance (effective resistance) of an induction motor as a function of rotor speed and AC signals rotating in forward and backward directions.
Figure 8:
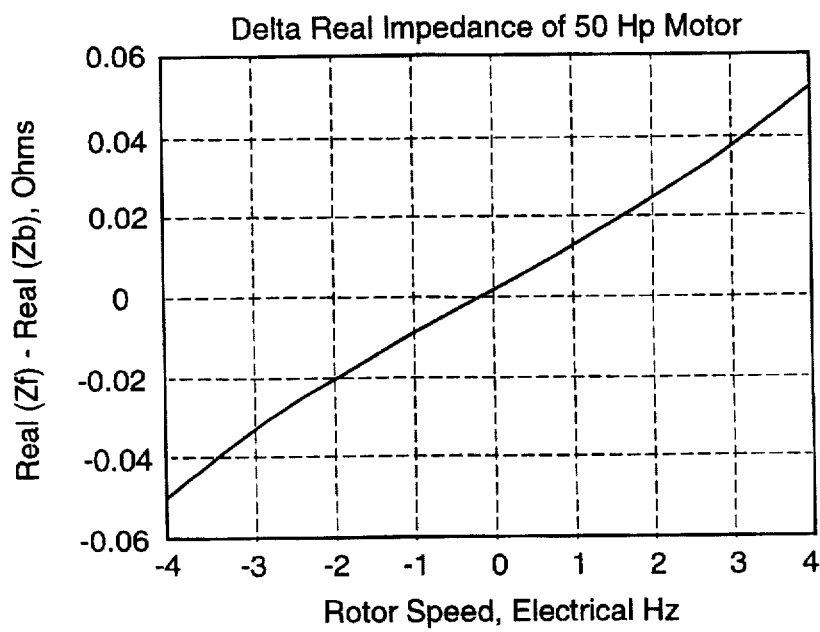
FIG. 8 is a graph showing a simulation of a difference in real impedances as seen by the forward and backward rotating AC signals of FIG. 7.

FIG. 7 is a graph showing a simulation of a real component of the impedance (effective resistance) of an induction motor as a function of rotor speed and AC signals rotating in forward and backward directions, and FIG. 8 is a graph showing a simulation of a difference in real impedances as seen by the forward and backward rotating AC signals of FIG. 7. The graphs are simulated for a typical 50 horsepower, 4-pole, 60 hertz, three-phase induction motor for two identical AC signals of frequency 10 hertz rotating in opposite directions.

Another embodiment of the invention uses an approximate difference between the real impedances of the two counter rotating injected component signals to obtain an estimated rotor velocity. The difference between the real impedances in the forward and backward rotating signals is approximately:

$$\text{real}(\bar{Z}_f) - \text{real}(\bar{Z}_b) \approx 2R_2\frac{L_m^2}{L_r^2}\frac{\omega_r}{\omega_i},$$

wherein $\bar{Z}_f$ represents the impedance as seen by the forward-rotating injected component and $\bar{Z}_b$ represents the impedance as seen by the backward-rotating injected component.

As discussed with respect to FIG. 2, a single-phase AC signal is equivalent to two counter rotating polyphase signals of equal amplitude and frequency. Thus the desired forward and backward rotating polyphase AC signals to be used for velocity estimation can be created by injection of one single phase signal. This signal can be injected in any reference frame relative to the stator frame, however, a synchronous reference frame aligned with the rotor flux vector is preferred to minimize undesirable torque ripple caused by interaction between the injected AC signal current and the fundamental flux.

The AC signal can be injected in the form of either a current command or a voltage command in the motor controller. A current command may be preferable for high-performance induction motor drive control algorithms that are based upon high-bandwidth current regulation, and a voltage command may be preferable in drive control algorithms without current regulation, such as direct torque control embodiments, for example. In the following discussion an injected current is discussed, but the process of injecting a voltage is analogous.

For a single-phase AC signal injection in the form of a current command in the synchronous reference frame, the net current command in the "Y" or flux axis can be calculated as:

$$i^*_y = i^*_{y1} + i^*_{yi}\sin\omega_i t$$

Although in the synchronous reference frame the injected AC signal is a single-phase current, in the stationary reference frame the signal is actually two polyphase signals of differing rotational frequencies, $\omega_i+\omega_e$ and $\omega_i-\omega_e$, where $\omega_e$ is the frequency of the synchronous reference frame. In this embodiment, the difference in real impedances is then approximately:

$$\text{real}(\bar{Z}_f) - \text{real}(\bar{Z}_b) \approx 2R_2 \frac{L_m^2}{L_r^2} \frac{\omega_r}{\omega_i+\omega_e}.$$

The resulting signal voltage in the axis orthogonal to the injected signal current can be expressed, in phasor notation, as:

$$\bar{V}_{xi} = j\frac{1}{2} \bar{I}_{yi}(\bar{Z}_f - \bar{Z}_b),$$

wherein $\bar{V}_{xi}$ represents the resulting signal voltage phasor in the axis orthogonal to the injected signal current phasor $\bar{I}_{yi}$.

Thus, the imaginary portion of the signal can be expressed as $$-\text{imag}\left(2\frac{\bar{V}_{xi}}{\bar{I}_{yi}}\right) = \text{real}(\bar{Z}_f) - \text{real}(\bar{Z}_b) \approx 2R_2 \frac{L_m^2}{L_r^2} \frac{\omega_r}{\omega_i+\omega_e}$$

Injection of an AC signal current into the flux-axis in a field oriented (i.e., vector or torque controlled) drive creates a small, but detectable, AC signal voltage in the quadrature (i.e., torque) axis at the same AC signal frequency. The component in quadrature with the signal current has an amplitude that depends upon the rotor speed. Thus, the rotor velocity can be estimated directly from the component of the measured instantaneous X-axis signal voltage that is in quadrature with the injected current:

$$\hat{\omega}_r \approx v_{xiq}\frac{\hat{L}_r^2}{\hat{L}_m^2} \frac{1}{\hat{R}_2} \frac{(\omega_i+\omega_e)}{I^*_{yi}}, \text{ wherein}$$

$$v_{xiq} = 2LPF(v_{xi}\cos\omega_i t) \text{ and}$$

$$v_{xi} = v_x - v^*_{xiff}.$$

The LPF is a low pass filter operation to isolate the quadrature X-axis signal voltage from the fundamental and in-phase signal component. Subtraction of the fundamental feed forward voltage, $v^*_{xiff}$, is optional, but recommended to minimize the amount of filtering required.

This embodiment, which recognizes that the impedances in the forward-rotating and backward-rotating signals are already present in a voltage component and that the component extraction can be accomplished by measuring the voltage in a spatially orthogonal phase to the injected current and extracting the component in the quadrature with the injected signal, is less complex than the embodiment described with respect to FIGS. 3–5 wherein more processing steps are required.

Figure 9:
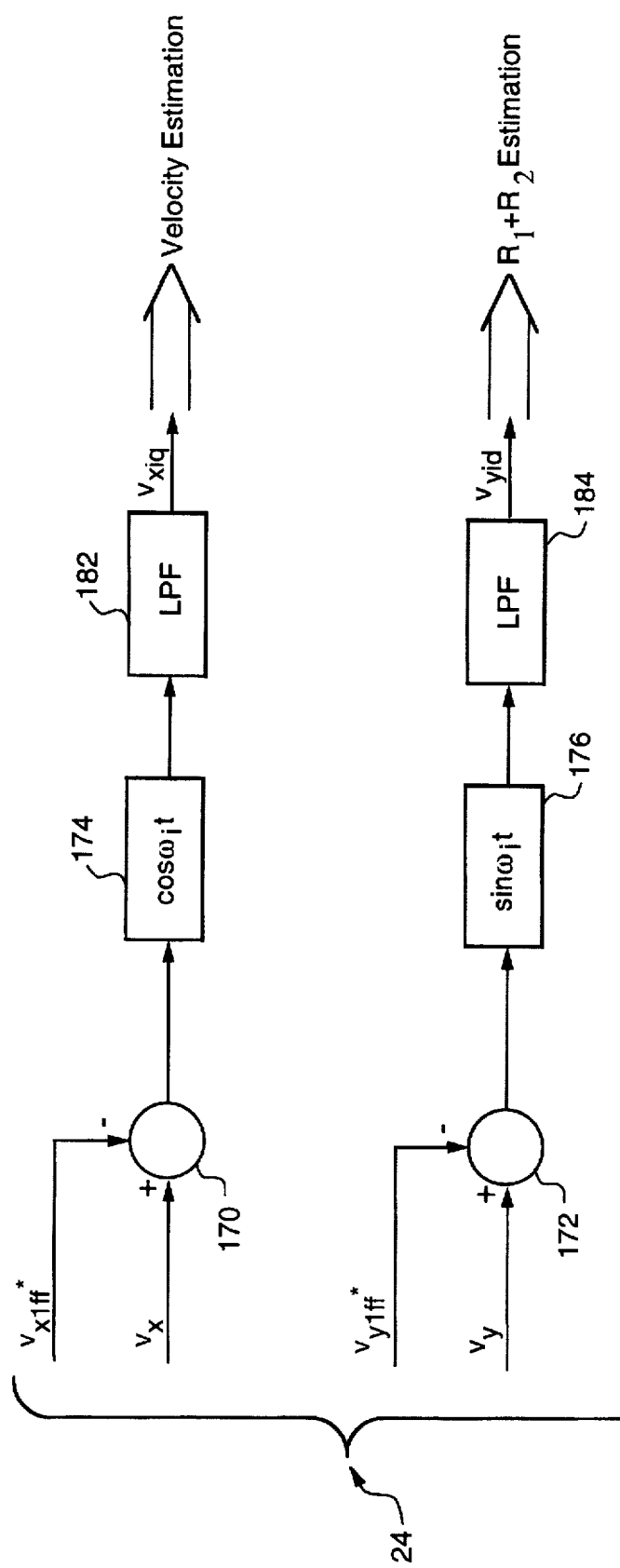
FIG. 9 is a block diagram of isolation of measured signal voltage components for rotor velocity estimation.

FIG. 9 is a block diagram of isolation of measured signal voltage components for rotor velocity estimation. To maximize the bandwidth of the rotor velocity estimate while minimizing distortion of the velocity estimate during system transients, bleed through of the fundamental voltage component should be minimized. Subtraction by subtractors 170 and 172 of an estimate of the fundamental voltage (such as the feed forward voltage references described with respect to FIG. 2) from the measured feedback voltages prior to multiplication by respective $\cos\omega_i t$ and $\sin\omega_i t$ elements 174 and 176, and filtering by respective low pass filters 182 and 184 is recommended as one method of reducing bleed through. A moving-average filter is a preferred type low pass filter.

The sum of stator and rotor resistance can be estimated from the signal Vyid in FIG. 9 with the equation:

$$\hat{R}_1 + \hat{R}_2 \approx \frac{v_{yid}}{I^*_{yi}} + \frac{\hat{L}_\sigma}{\hat{\tau}_r}, \text{ wherein}$$

$$v_{yid} = 2LPF((v_y - v^*_{yiff})\sin\omega_i t)$$

and $\hat{\tau}_r$ is the estimated rotor time constant.

Separate values for $\hat{R}_1$ and $\hat{R}_2$ at a specific operating temperatures can be obtained via design data sheets or direct measurement prior to motor operation. Based upon knowledge of the applied motor's thermal characteristics, $\hat{R}_1$ and $\hat{R}_2$ can be separated from the estimated sum during motor operation. The value for $\hat{R}_2$ can be used for rotor velocity estimation. The rotor resistance as estimated via the injected signal will be affected by skin effects in the same manner as the required value for the rotor velocity estimation.

To further minimize bleed through of the fundamental and reject interference from any time varying component of mechanical load that falls at an interfering frequency, the embodiment can be extended to incorporate multiple AC signals of differing frequencies, even to the point where injection and detection occur over a spread spectrum.

In one embodiment, the sum of two signals is injected at two different frequencies, and the rotor velocity is calculated as the average of the estimates from each of the signals as follows:

$$v_{xiq1} = 2LPF(v_{xi}\cos\omega_{i1}t),$$

$$v_{xiq2} = 2LPF(v_{xi}\cos\omega_{i2}t),$$

$$\hat{\omega}_{r1} \approx v_{xiq1}\frac{\hat{L}_r^2}{\hat{L}_m^2} \frac{1}{\hat{R}_2} \frac{(\omega_{i1}+\omega_e)}{I^*_{yi1}},$$

$$\hat{\omega}_{r2} \approx v_{xiq2}\frac{\hat{L}_r^2}{\hat{L}_m^2} \frac{1}{\hat{R}_2} \frac{(\omega_{i2}+\omega_e)}{I^*_{yi2}},$$

$$\hat{\omega}_r = \frac{1}{2}(\hat{\omega}_{r1} + \hat{\omega}_{r2}),$$

wherein $v_{xiq1}$ and $v_{xiq2}$ represent quadrature signal voltage with respect to the injected signal component at frequencies $\omega_{i1}$ and $\omega_{i2}$, respectively, and $\hat{\omega}_{r1}$ and $\hat{\omega}_{r2}$ represent the corresponding rotor velocity estimations.

Some flexibility exists in the selection of injected signals and the sequence of operations. Within the preferred frequency range of about 5 hertz to about 30 hertz, any two frequencies can be used. It is not even necessary for the higher of the frequencies to be an exact multiple of the lower frequency, although doing so provides greater flexibility in the selection of the sequence of operations. In order to minimize bleed through and to reject interference, the amplitudes of the two injected signals should be approximately equal.

In another approach for detecting the X-axis signals that are in quadrature with the injected currents, the sequence of operations is rearranged to reduce the number of low pass filters from two to one with the following equations:

$$v_{xiq} = 2LPF\left(v_{xi}\left(\frac{(\omega_{i1}+\omega_e)}{I^*_{yi1}}\cos(\omega_{i1}t) + \frac{(\omega_{i2}+\omega_e)}{I^*_{yi2}}\cos(\omega_{i2}t)\right)\right) \text{ an}$$

-continued $$\hat{\omega}_r = V_{xiq} \frac{\hat{L}_r^2}{\hat{L}_m^2} \frac{1}{\hat{R}_2} \frac{1}{2}.$$

This embodiment has a reduced computational burden. Using a single low pass moving-average filter for both frequency components requires the higher frequency component be an integer multiple of the lower frequency component.

The relative phase angle of the two injected signals is another parameter that can be adjusted. When the higher frequency component is an integer multiple of the lower frequency component, the relative phase angle of the two signals should be set to avoid having the peak values from each signal coincide. The equations for $V_{xiq1}$ and $V_{vxiq2}$ then become:

$$v_{xiq1} = 2LPF(v_{xi}\cos(\omega_{i1}t+\theta_1)),$$

and $$v_{xiq2} = 2LPF(v_{xi}\cos(\omega_{i2}t+\theta_2)),$$

wherein $\theta_1$ and $\theta_2$ represent the phase angles of the two injected signals.

The above embodiment can be extended to any of a number of frequency components in a spread spectrum approach. In such embodiment, the injected signal is calculated as follows:

$$i^*_{yi} = \sum_k I^*_{yik}\sin(\omega_{ik}t + \theta_k).$$

The injected signal can be precalculated and stored as in a lookup table. For convenience, it is a good idea for the net signal to be periodic so that each frequency is a multiple of some lowest common denominator, which may or may not be present in the signal. The lowest common denominator establishes the period. For example, if the frequency components selected are 6, 8, 9, and 12 hertz, the lowest common denominator is 1 hertz, so the lookup table should have a period of one second.

The calculations for detection are as follows:

$$v_{xiq} = 2LPF\left(v_{xi}\sum_k\left(\frac{(\omega_{ik}+\omega_e)}{I^*_{yik}}\cos(\omega_{ik}t+\theta_k)\right)\right) \text{ and }$$

$$\hat{\omega}_r = V_{xiq}\frac{\hat{L}_r^2}{\hat{L}_m^2}\frac{1}{\hat{R}_2}\frac{1}{N}.$$

The sum can be split into two sets of terms so that detection is accomplished by multiplication by two precalculated functions:

$$\sum_k\left(\frac{(\omega_{ik}+\omega_e)}{I^*_{yik}}\cos(\omega_{ik}t+\theta_k)\right) = \sum_k\left(\frac{\omega_{ik}}{I^*_{yik}}\cos(\omega_{ik}t+\theta_k)\right) +$$

$$\omega_e\sum_k\left(\frac{1}{I^*_{yik}}\cos(\omega_{ik}t+\theta_k)\right).$$

If the detection is performed with a combined signal detection, the lowest common frequency must correspond to the window size of the moving-average filter. If each signal is treated separately, then each low pass filter can use a different size window, and there is no constraint on the lowest common frequency. For spread spectrum injection, using a combined signal for detection is recommended.

To select the amplitude and phase angle of each frequency component, a signal should be developed that will not correlate with any frequency component of the load and which does not have excessive peaks.

In one embodiment, a white noise sequence is generated over the time window corresponding to the moving-average filter. Then a discrete fourier transform is taken of the sequence over the time window. The resulting spectrum has an approximately uniform amplitude and random phase angle. The highest and lowest desired frequencies in the injected frequency are selected, and frequencies falling outside that range are discarded. The remaining components can be use to precalculate the injection and detection functions.

The invention is applicable to the injection of a counter rotating signal and its detection in any reference frame. The key feature is that the injection and the detection occur in orthogonal axes of the chosen reference frame.

Because the desirable output signal amplitude ($v_{xiq}$) is inversely proportional to the injected signal frequency $\omega_i$, the signal frequency should be as low as possible to maximize the signal-to-noise ratio. A preferred frequency range is from about 5 hertz to about 30 hertz. The lower limit is governed by torque ripple, while the upper limit is governed by feedback resolution.

Torque ripple created by the injected signal at the signal frequency can result in a speed ripple also at the signal frequency. Speed ripple may induce significant errors in the estimated velocity, especially when the motor is under load. If the amount of speed ripple at the signal frequency is known, then compensation or correction of the velocity estimate can be performed. In general, the speed ripple is not known or predictable, and thus must be minimized.

Signal-induced speed ripple can be reduced by increasing the signal injection frequency, decreasing the signal amplitude, or increasing the motor and/or load inertia. Both increasing the signal injection frequency and reducing the signal amplitude require higher signal feedback resolution. Although minimizing the signal amplitude is desirable to reduce torque, speed ripple, and additional motor losses, in general it does not reduce the velocity estimate error caused by speed ripple because the signal strength is also reduced. The invention is thus most readily implementable in systems with high feedback resolution and large inertia.

The velocity estimation is intended for operation at low and zero fundamental excitation frequencies (typically below 1%–3% rated frequency). Above 1%–3% rated frequency, existing fundamental-based sensorless schemes can be made sufficiently robust and accurate.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for estimating rotor shaft velocity comprising:
   adding two counter rotating signal components to a fundamental motor control signal to provide a combined control signal;
   sensing at least one motor phase signal;
   determining an extracted portion of the at least one motor phase signal representative of the two counter rotating signal components; and using the extracted portion to estimate rotor shaft velocity.

2. The method of claim 1, wherein the frequency of the two counter rotating signal components ranges from about five hertz to about thirty hertz.

3. The method of claim 1, wherein the step of sensing the at least one motor phase signal comprises sensing a plurality of motor phase signals including motor voltage phase signals and motor current phase signals and wherein the step of determining the extracted portion includes estimating selected ones of the plurality of motor phase signals, using the estimated motor phase signals and the sensed motor phase signals to obtain estimated forward and backward counter rotating signals and measured forward and backward counter rotating signals, respectively, representative of instantaneous real power, using the estimated forward and backward counter rotating signals and measured forward and backward counter rotating signals representative of instantaneous real power to determine the existence of a velocity error signal, and using the velocity error signal to estimate rotor shaft velocity.

4. The method of claim 3, wherein the two counter rotating signal components and the selected ones of the motor phase signals comprise one of the group consisting of current signals and voltage signals.

5. The method of claim 3, further including using the estimated forward and backward counter rotating signals and measured forward and backward counter rotating signals representative of instantaneous real power to determine the existence of a stator resistance error signal and a rotor resistance error signal, and using the stator resistance and rotor resistance error signals to respectively estimate a stator resistance and a rotor resistance, and wherein estimating selected ones of the motor phase signals includes using the estimated rotor shaft velocity, the estimated stator resistance, and the estimated rotor resistance.

6. The method of claim 5, further including using the estimated motor phase signals and the sensed motor phase signals to obtain estimated forward and backward counter rotating signals and measured forward and backward counter rotating signals, respectively, representative of instantaneous imaginary power, using the estimated forward and backward counter rotating signals and measured forward and backward counter rotating signals representative of instantaneous imaginary power to determine the existence of a stator transient inductance error signal, and using the stator transient inductance error signal to estimate a stator transient inductance, and wherein estimating selected ones of the motor phase signals includes using the estimated stator transient inductance.

7. The method of claim 3, wherein the step of adding the two counter rotating signal components to the fundamental motor control signal comprises adding, to the fundamental motor control signal, a single phase signal that is in a reference frame synchronous to the fundamental motor control signal.

8. The method of claim 7, wherein the reference frame is synchronous to a rotor flux vector and the single phase signal is in a flux axis in a field oriented motor drive.

9. The method of claim 3, wherein the step of adding the two counter rotating signal components to the fundamental motor control signal comprises adding two separate signals to the fundamental motor control signal.

10. The method of claim 1, wherein the step of adding the two counter rotating signal components to the fundamental motor control signal to provide the combined control signal comprises adding two counter rotating current components to a fundamental motor current control signal to provide a combined current control signal, and the steps of sensing the at least one motor phase signal and determining the extracted portion comprise measuring a voltage phase signal in a spatially orthogonal phase to the two counter rotating current components and extracting a portion of the voltage phase signal in quadrature with the two counter rotating current components.

11. The method of claim 10, wherein the step of determining the extracted portion includes approximating the difference between impedances as seen by the two counter rotating current components.

12. The method of claim 10, wherein the step of adding the two counter rotating current components to the fundamental motor current control signal comprises adding, to the fundamental motor current control signal, a single phase current signal in a reference frame synchronous to the fundamental motor current control signal.

13. The method of claim 12, wherein the step of adding the single phase current signal in the reference frame synchronous to the fundamental motor current control signal comprises adding two single phase current signals, each single phase current signal having a different frequency, and wherein the steps of sensing the at least one motor phase signal, determining the extracted portion, and using the extracted portion to estimate rotor shaft velocity include determining two extracted portions, separately estimating two rotor shaft velocities, and averaging the two separately estimated rotor shaft velocities.

14. The method of claim 12, wherein the step of using the extracted portion to estimate the rotor shaft velocity ($\hat{\omega}_r$) includes performing the following calculation:

$$\hat{\omega}_r = V_{xiq} \frac{\hat{L}_r^2}{\hat{L}_m^2} \frac{1}{\hat{R}_2} \frac{(\omega_i + \omega_e)}{I^*_{yi}},$$

wherein $V_{xiq}$ represents a portion of the voltage phase signal in quadrature with the single phase current signal, $\hat{R}_2$ represents a rotor resistance, $\hat{L}_m$ represents a magnetizing inductance, $\hat{L}_r$ represents a rotor inductance, $\omega_i$ represents a frequency of the single phase current signal, $\omega_e$ represents a frequency of the synchronous reference frame to the fundamental motor control signal, and $I^*_{yi}$ represents a maximum amplitude of the single phase current signal.

15. The method of claim 14, wherein the step of adding the single phase current signal in the reference frame synchronous to the fundamental motor current control signal comprises adding two single phase current signals, each single phase current signal having a different frequency $\omega_{i1}$ and $\omega_{i2}$, and wherein $V_{xiq}$ is calculated as follows:

$$V_{xiq} = 2LPF\left(V_{xi}\left(\frac{(\omega_{i1}+\omega_e)}{I^*_{yi1}}\cos(\omega_{i1}t) + \frac{(\omega_{i2}+\omega_e)}{I^*_{yi2}}\cos(\omega_{i2}t)\right)\right),$$

wherein LPF represents a low pass filter, t represents time, $V_{xi}$ represents the difference between the voltage phase signal and a feed forward voltage signal, and $I^*_{yi1}$ and $I^*_{yi2}$ represent respective maximum amplitudes of the two single phase current signals.

16. The method of claim 14, wherein the step of adding the single phase current signal in the reference frame synchronous to the fundamental motor current control signal comprises adding a plurality k of single phase current signals $i^*_{yi1} \ldots i^*_{yik}$, each single phase current signal having a different frequency $\omega_{i1} \ldots \omega_{ik}$, and wherein $V_{xiq}$ is calculated as follows:

$$V_{xiq} = 2LPF\left(V_{xi}\sum_k\left(\frac{(\omega_{ik}+\omega_e)}{I^*_{yik}}\cos(\omega_{ik}t+\theta_k)\right)\right),$$

wherein LPF represents a low pass filter, t represents time, $V_{xi}$ represents the difference between the voltage phase signal and a feed forward voltage signal, $I^*_{yik}$ represents a maximum amplitude of a kth signal phase current signal, and $\theta_k$ represents a phase angle of the kth single phase current signal.

17. The method of claim 1, wherein the step of adding the two counter rotating signal components to the fundamental motor control signal to provide a combined control signal comprises adding two counter rotating voltage components to a fundamental motor voltage control signal to provide a combined voltage control signal, and the steps of sensing the at least one motor phase signal and determining the extracted portion comprise measuring a current phase signal in a spatially orthogonal phase to the two counter rotating voltage components and extracting a portion of the current phase signal in quadrature with the two counter rotating voltage components.

18. A rotor shaft velocity estimator comprising:

an adder for adding two counter rotating signal components to a fundamental motor control signal to provide a combined control signal;

at least one motor phase signal sensor; and a processor for determining an extracted portion of at least one sensed motor phase signal representative of the two counter rotating signal components and using the extracted portion to estimate rotor shaft velocity.

19. The estimator of claim 18, wherein the at least one motor phase signal sensor is capable of sensing motor voltage phase signals and motor current phase signals, and wherein the processor is capable of determining the extracted portion by estimating selected ones of the motor phase signals, using the estimated motor phase signals and the sensed motor voltage and current phase signals to obtain estimated forward and backward counter rotating signals and measured forward and backward counter rotating signals, respectively, representative of instantaneous real power, using the estimated forward and backward counter rotating signals and measured forward and backward counter rotating signals representative of instantaneous real power to determine the existence of a velocity error signal, and using the velocity error signal to estimate the rotor shaft velocity.

20. The estimator of claim 19, wherein the process is further capable of using the estimated forward and backward counter rotating signals and measured forward and backward counter rotating signals representative of instantaneous real power to determine the existence of a stator resistance error signal and a rotor resistance error signal, using the stator resistance and rotor resistance error signals to respectively estimate a stator resistance and a rotor resistance, and using the estimated rotor shaft velocity, the estimated stator resistance, and the estimated rotor resistance for estimating the selected ones of the motor phase signals.

21. The estimator of claim 19, wherein the adder is adapted to add the two counter rotating signal components to the fundamental motor control signal by adding, to the fundamental motor control signal, a single phase signal in a reference frame synchronous to the fundamental motor control signal.

22. The estimator of claim 19, wherein the adder is adapted to add the two counter rotating signal components to the fundamental motor control signal by adding two separate signals to the fundamental motor control signal.

23. The estimator of claim 18, wherein the adder is adapted to add the two counter rotating signal components to the fundamental motor control signal by adding two counter rotating current components to a fundamental motor current control signal to provide a combined current control signal, and the at least one motor phase signal sensor is adapted to measure a voltage phase signal in a spatially orthogonal phase to the two counter rotating current components, and the processor is adapted to determine the extracted portion by extracting a portion of the voltage phase signal in quadrature with the two counter rotating current components.

24. The estimator of claim 23, wherein the processor is further adapted to determine the extracted portion by approximating the difference between impedances as seen by the two counter rotating current components.

25. The estimator of claim 23, wherein the adder is adapted to add the two counter rotating current components by adding a single phase current signal in a reference frame synchronous to the fundamental motor current control signal.

26. The estimator of claim 18, wherein the adder is adapted to add the two counter rotating signal components to a fundamental motor control signal by adding two counter rotating voltage components to a fundamental motor voltage control signal to provide a combined voltage control signal, the at least one motor phase signal sensor is adapted to measure a current phase signal in a spatially orthogonal phase to the two counter rotating voltage components, and the processor is adapted to determine the extracted portion by extracting a portion of the current phase signal in quadrature with the two counter rotating voltage components.

* * * * *